No. 829,863. PATENTED AUG. 28, 1906.
J. H. FREEZE.
STRAW RACK FOR GRAIN SEPARATORS.
APPLICATION FILED JULY 3, 1905.
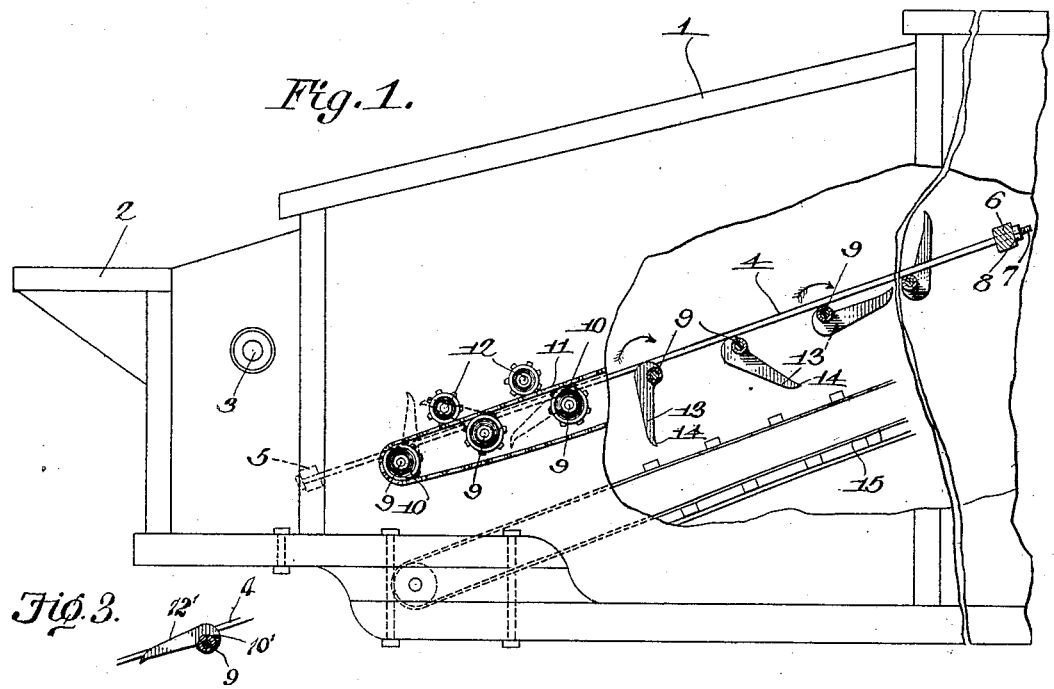
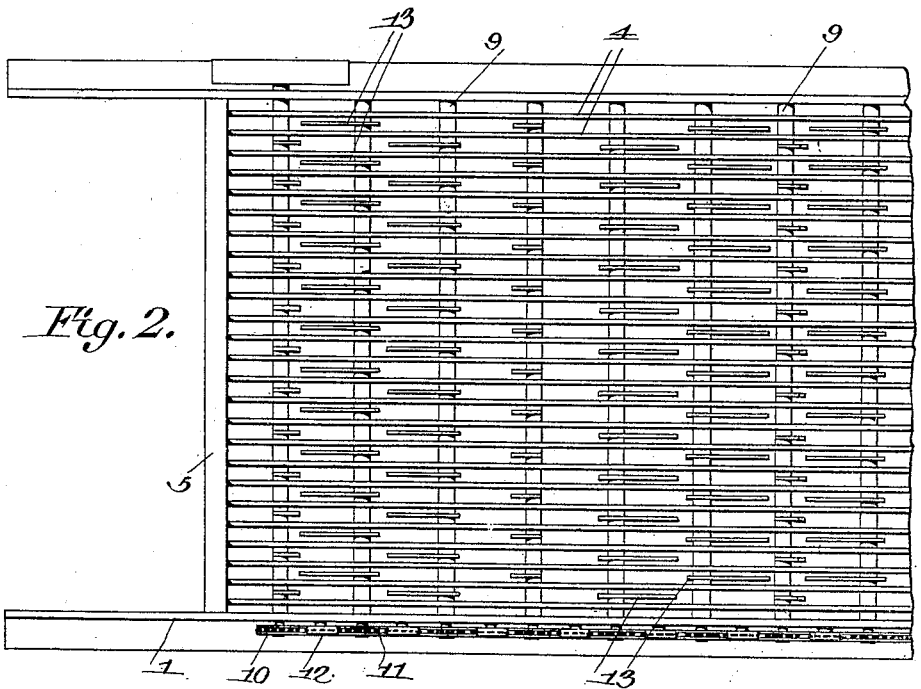
John H. Freeze, Inventor.

UNITED STATES PATENT OFFICE.

JOHN HENRY FREEZE, OF ADVANCE, MISSOURI, ASSIGNOR OF TWO-THIRDS TO JOHN H. SCHONHOFF AND CLEMENS A. SCHONHOFF, OF ADVANCE, MISSOURI.

STRAW-RACK FOR GRAIN-SEPARATORS.

No. 829,863.　　　Specification of Letters Patent.　　　Patented Aug. 28, 1906.

Application filed July 3, 1905. Serial No. 268,162.

*To all whom it may concern:*

Be it known that I, JOHN HENRY FREEZE, a citizen of the United States, residing at Advance, in the county of Stoddard and State of Missouri, have invented a new and useful Straw-Rack for Grain-Separators, of which the following is a specification.

This invention relates to straw-racks for grain-separators; and it has for its object to provide improved means for conveying the threshed material rearward in the casing of a separator and for meanwhile separating the grain and heavy particles from the straw and light particles.

A further object of the invention is to simplify and improve the construction and operation of this class of devices.

In the accompanying drawings has been illustrated a simple and preferred mechanism for carrying the invention into practical operation, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a side elevation of a portion of a separator-casing containing the invention, parts of the near side of the casing having been removed and other parts being shown in section. Fig. 2 is a top plan view of the parts constituting the invention, showing the same supported in the separator-casing. Fig. 3 is a sectional detail view taken through one of the shafts and showing one of the work-engaging fingers in a different position from that illustrated in Fig. 1.

Corresponding parts in the several figures are indicated throughout by similar characters of reference.

A casing 1 of ordinary construction is provided with a feed-board 2 and with bearings for a cylinder-carrying shaft 3, which operates, in conjunction with the concave, (not shown,) to thresh material fed between said cylinder and concave.

Supported lengthwise in the casing are a plurality of rods or wires 4 4, disposed parallel to each other, the front ends of said rods being secured in a cross-bar 5, while the rear ends have been shown as extended through a cross-bar 6 near the rear end of the casing, said rear ends of the rods or wires being threaded, as shown at 7, and provided with nuts 8, whereby they may be tightened to any desired degree of tension. These rods or wires are placed moderately close together, so that they will coöperate to form a screen extending through the greater part of the length of the casing and through which grain, bits of heads with grain attached thereto, and other small and relatively heavy fragments may escape into the lower part of the casing, while the straw and lighter particles remain supported upon the rack or screen formed by the rods or wires 4.

Other means than those herein shown may be used for supporting and tightening the rods or wires 4; but the means just described, and illustrated in the drawings, will be found simple and effective.

Beneath the wires 4 are disposed a plurality of shafts 9, the ends of which are journaled in the sides of the casing, projecting at one side and provided upon their projecting ends with driving means, such as sprockets 10, connected by a link belt 11, which is held in engagement with the respective sprockets by means of idlers 12 or by any other suitable means. It is also to be understood that any other well-known and approved means than those herein shown and described may within the scope of the invention be utilized for driving the shafts, provided that all of said shafts shall be driven in the same direction, which is indicated by arrows in the drawings. Each of the shafts 9 carries a plurality of fingers 13, which are preferably of the peculiar cam shape clearly illustrated in Figs. 1 and 3 of the drawings, said fingers being provided with shoulders 10' with straight work-engaging faces 12', which are tangential to a circuit of larger diameter than the shaft upon which the finger is mounted, and provided at their outer extremities with curved points 14, facing oppositely to the direction of rotation.

By the peculiar construction of the fingers, as just described and as will be clearly seen in Fig. 3 of the drawings, the straight work-engaging faces of the fingers will at a time during the rotation of the shafts lie parallel to and slightly above the upper or supporting faces of the rods or wires 4, thus bodily engaging the mass of material supported upon said rods or wires and moving or throwing the same in a rearward direction much more effectively than if the material were engaged by the points or terminal ends of the fingers only, said fingers being already in a rearwardly-tilted position, as would necessarily be the case if the working faces of the fingers were radial to the shaft, or approximately so.

Each shaft is preferably provided with fingers 13, disposed between alternate pairs of wires 4, and alternate shafts carry intercurrently-disposed fingers, so that the fingers upon any two adjacent shafts will occupy the spaces between all of the wires 4. The fingers 13 are, moreover, disposed to radiate in different directions from the shafts upon which they are mounted, the fingers of each shaft being so disposed as to move upward at the time when the fingers upon the shaft next in front have reached the highest point and are beginning to move in a downward direction. Thus material supported upon the upgoing fingers will slide downwardly toward the wires constituting the screen, only to be intercepted by the upgoing fingers of the shaft next behind, and thus keeping the threshed material in a constant state of agitation and commotion while it is being moved rearwardly through the casing, which is very effective in pulling asunder such tangled and matted portions as may exist and in permitting the grain to separate freely from the straw and chaff and to drop between the wires constituting the screen. Beneath the screen is disposed an endless carrier, as 15, which serves to convey the grain separated from the straw to the cleaning mechanism (not shown) or to any desired place of deposit or exit.

In grain-separators it is a desideratum that the threshed material be well supported in its rearward passage through the casing of the machine, and it is also extremely desirable that the downward passage of the grain be as far as possible unobstructed. It is also very important that the mass of threshed material be thoroughly shaken and agitated while it is being passed rearwardly through the casing of the machine.

By forming the straw-rack of a plurality of longitudinally-disposed rods or wires which are stretched taut lengthwise through the casing a firm support will be afforded for the threshed material, and the downward passage of the grain will be as far as possible unobstructed, the rods or wires being quite slender and unconnected by cross-wires to form meshes. In this respect the longitudinal rods of this invention differ materially from wire screens of ordinary construction, and also from longitudinal supporting-rods such as are found in straw-racks composed of boards and planks. The fingers 13 of the rotary shafts 9 may operate freely between the rods or wires to feed and at the same time to shake and agitate the straw and threshed material, and if any one of the rods or wires should by any chance become slack, so as to interfere with the operation of the fingers upon the rotary shafts, it may be very readily and quickly tightened, thus restoring the device to perfect operative condition.

The object and advantages of this invention will be readily understood from the foregoing description, taken in connection with the drawings hereto annexed. It is simple in construction and durable and effective in operation.

Having thus described the invention, what is claimed is—

1. In a grain-separator, a casing, cross-bars secured transversely in said casing, a straw-rack composed of longitudinal rods or wires extending through the cross-bars parallel to each other, unconnected intermediate their ends and in an upwardly and rearwardly inclined position, tightening means threaded upon the ends of the wires and bearing against the cross-bars, shafts supported for rotation directly beneath the rods or wires, and fingers upon said shafts having rounded shoulders and straight working faces tangential to circles of larger diameter than said shafts, whereby said working faces will engage material supported upon the rods or wires when said working faces are in the position parallel to and slightly raised above the upper or supporting faces of said rods or wires.

2. In a grain-separator, a casing, a straw-rack composed of a plurality of wires stretched longitudinally through the casing, transverse shafts disposed at intervals beneath the wires, and fingers upon said shafts having straight work-engaging fingers tangential to circles of larger diameter than the shafts, said work-engaging faces being adapted to engage material supported upon the rods or wires when said faces are parallel to and slightly above the upper edges or faces of said wires.

3. In a grain-separator, a casing, a straw-rack composed of a plurality of wires stretched longitudinally through the casing, transverse shafts disposed at intervals between the wires, and fingers upon said shafts having straight work-engaging faces tangential to circles of larger diameter than the shafts; said fingers being disposed between alternate pairs of wires and intercurrently upon alternate shafts so that the fingers upon any two adjacent shafts will occupy the spaces between all of the wires.

In testimony that I claim the foregoing as my own I have hereto affixed my signature in the presence of two witnesses.

JOHN HENRY FREEZE.

Witnesses:
J. H. SCHONHOFF,
MAYME MAYFIELD.